United States Patent [19]

Washizuka

[11] Patent Number: 4,648,070

[45] Date of Patent: Mar. 3, 1987

[54] ELECTRONIC TRANSLATOR WITH MEANS FOR SELECTING WORDS TO BE TRANSLATED

[75] Inventor: Isamu Washizuka, Soraku, Japan

[73] Assignee: Sharp Kabushiki Kaisha, Osaka, Japan

[21] Appl. No.: 820,888

[22] Filed: Jan. 17, 1986

Related U.S. Application Data

[63] Continuation of Ser. No. 414,921, Sep. 3, 1982, abandoned.

[30] Foreign Application Priority Data

Sep. 8, 1981 [JP] Japan .................. 56-141998
Sep. 8, 1981 [JP] Japan .................. 56-141999

[51] Int. Cl.$^4$ .................................. G06F 15/38
[52] U.S. Cl. .................................. 364/900
[58] Field of Search ............ 364/200, 900, 709

[56] References Cited

U.S. PATENT DOCUMENTS

| | | | |
|---|---|---|---|
| 4,092,527 | 5/1978 | Luecke | 364/709 |
| 4,130,882 | 12/1978 | Swanstrom et al. | 364/900 |
| 4,151,596 | 4/1979 | Howells | 364/709 |
| 4,158,236 | 6/1979 | Levy | 364/900 |
| 4,193,119 | 3/1980 | Arase et al. | 364/900 |
| 4,205,516 | 6/1980 | Terao | 368/29 |
| 4,218,760 | 8/1980 | Levy | 364/900 |
| 4,263,658 | 4/1981 | Fujita | 364/709 |
| 4,272,826 | 6/1981 | Deutsch | 364/709 |
| 4,328,562 | 5/1982 | Hashimoto et al. | 364/900 |
| 4,339,806 | 7/1982 | Yoshida | 364/900 |
| 4,354,260 | 10/1982 | Planzo | 368/10 |
| 4,355,370 | 10/1982 | Yanagiuchi | 364/900 |
| 4,362,392 | 12/1982 | Kumata | 368/82 |
| 4,367,537 | 1/1983 | Yoshida et al. | 364/900 |
| 4,373,192 | 2/1983 | Yanagiuchi et al. | 364/900 |
| 4,381,551 | 4/1983 | Kanou et al. | 364/900 |
| 4,383,306 | 5/1983 | Morimoto | 364/900 |
| 4,393,460 | 7/1983 | Masuzawa et al. | 364/900 |
| 4,393,462 | 7/1983 | Tanimoto et al. | 364/900 |
| 4,417,319 | 11/1983 | Morimoto et al. | 364/900 |
| 4,482,981 | 11/1984 | Morimoto et al. | 364/900 |

FOREIGN PATENT DOCUMENTS 2014765 8/1979 United Kingdom .

OTHER PUBLICATIONS

Scientific American, "Language Translator" as described by JS&A Products, Feb. 1979, pp. 4–5.

*Primary Examiner*—Thomas M. Heckler
*Assistant Examiner*—Daniel K. Dorsey
*Attorney, Agent, or Firm*—Birch, Stewart, Kolasch & Birch

[57] ABSTRACT

An electronic translator comprises a specifying device for specifying letters to be input. An input device cooperates with the specifying device to input the specified letters into the electronic translator. The translator also includes a memory for memorizing a plurality of words containing the input letters, an access circuit for addressing the memory to retrieve such words and a display responsive to the access circuit for displaying the retrieved words and translated equivalent words. The specifying device is operated with only a few keys to enable input of any letter of the alphabet.

15 Claims, 9 Drawing Figures

| NO. | KEY | DISPLAY |
|---|---|---|
| (1) | ▶ | ABC ---- Z<br>A |
| (2) | ▶ | ABC ---- Z<br>B |
| (3) | IN | ABC ---- Z<br>B_ |
| (4) | ◀ | ABC ---- Z<br>BA |
| (5) | ◀ | ABC ---- Z<br>BZ |
| | ⋮ | ⋮ |
| (6) | ◀ | ABC --- NOP --- Z<br>BO |
| (7) | IN | BOARD |
| (8) | ▶ | BOAT |
| (9) | TR. | ボート, コブ゛ネ |

FIG. 4

| A , AN |
|---|
| ヒトツノ |
| ABLE |
| ユウノウナ |
| |
| BLUE |
| アオイ, アオ |
| BOARD |
| イタ, イタヲハル |
| BOAT |
| ボート, コブネ |
| BODY |
| カラダ |
| |
| ZOO |
| ドウブツエン |

| NO. | KEY | DISPLAY |
|---|---|---|
| (1) | ▶ | ABC ---- Z<br>A |
| (2) | ▶ | ABC ---- Z<br>B |
| (3) | IN | ABC ---- Z<br>B_ |
| (4) | ◀ | ABC ---- Z<br>B A |
| (5) | ◀ | ABC ---- Z<br>B Z |
| | ⋮ | ⋮ |
| (6) | ◀ | ABC --- NOP --- Z<br>BO |
| (7) | IN | BOARD |
| (8) | IN | BOAT |
| (9) | TR. | ボート, コブネ |

ELECTRONIC TRANSLATOR WITH MEANS FOR SELECTING WORDS TO BE TRANSLATED

This application is a continuation of application Ser. No. 414,921, filed on Sept. 3, 1982, now abandoned.

BACKGROUND OF THE INVENTION

The present invention generally relates to a word information storage and retrieval device, and more particularly to an electronic translator for providing efficient and rapid retrieval of any desired words or sentences stored therein.

Recently, electronic devices called electronic translators have become available on the market. The electronic translators require efficient and rapid retrieval of word information stored in a memory.

SUMMARY OF THE INVENTION

Accordingly, it is an object of the present invention to provide an improved electronic translator for enabling rapid input of word information into the translator.

It is another object of the present invention to provide an improved electronic translator for inputting word information to be retrieved from a memory with few operations of input key means.

It is a further object of the present invention to provide an improved electronic translator for retrieving word information from a memory with a letter-inputting key switch and a search key.

Briefly described, in accordance with the present invention, an electronic translator comprises a specifying device for specifying letters, an input device for controlling input of the specified letters into the electronic translator, a memory for memorizing a plurality of words containing the letters, an access circuit for addressing the memory to retrieve such words, and a display responsive to the access circuit for displaying the retrieved words and translated words.

BRIEF DESCRIPTION OF THE DRAWINGS

The present invention will be more fully understood from the detailed description of selected embodiments given hereinbelow and accompanying drawings which are given by way of illustration only, and thus are not limitative of the present invention and wherein.

DESCRIPTION OF THE INVENTION

First of all, any kind of language can be translated by an electronic translator according to the present invention. Words are input in a specific language to obtain equivalent words, or translated words in a different language corresponding thereto. The kind of language can be freely selected. According to an example of the present invention, it is assumed that the input language is English and the translated language is Japanese. The electronic translator can operate as a conventional electronic calculator.

Figure 1:
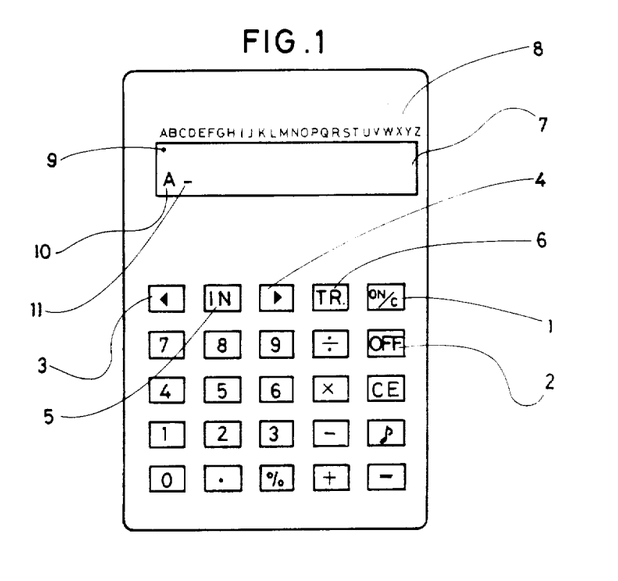
FIG. 1 shows a plan view of an electronic translator according to the present invention.

FIG. 1 shows the electronic translator according to the present invention. The translator comprises a power on/clear key 1, a power off key 2, a backward search key 3, a forward search key 4, a letter inputting key 5, a translation key 6, a display 7, A-Z indices 8, a dot display 9, a first-inputted letter display 10 and a cursor 11. The A-Z indices 8 are printed above the display 7. The dot display 9 is displayed to indicate a presently selected letter from A-Z by specifying one from the A-Z indices 8.

Other key switches are actuated to enable the conventional electronic calculator.

Figure 2:
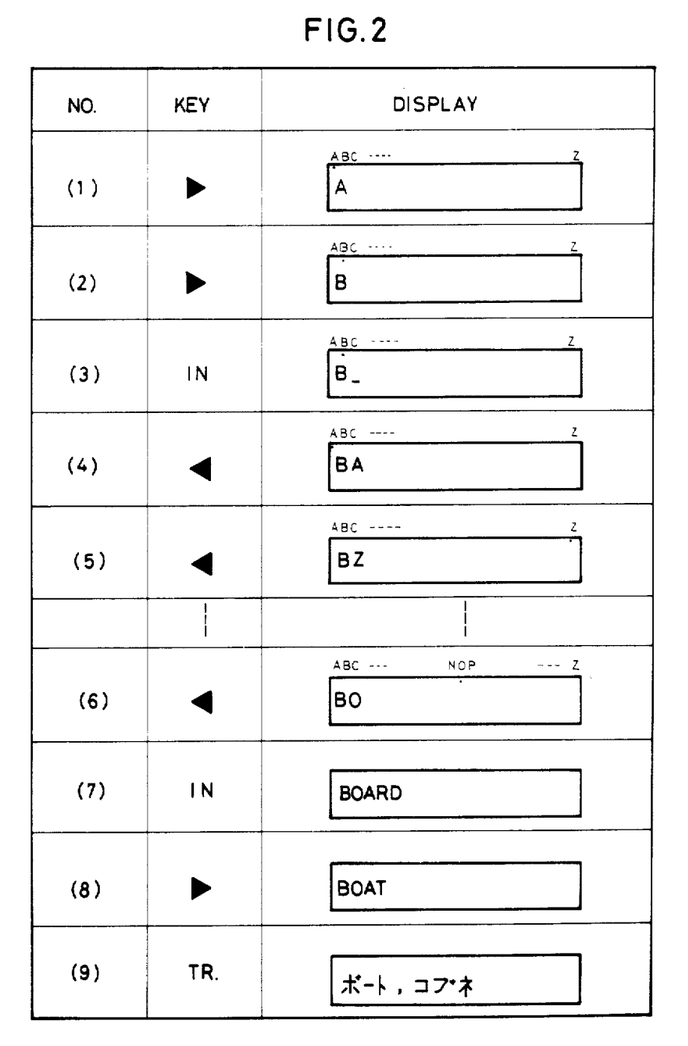
FIG. 2 shows a table representing the relation between key switches actuated and displays, in a specific form of the present invention.

FIG. 2 shows a table representing the relation between key switches actuated and displays, in which an English word "BOAT" is inputted to develop its translated Japanese word.

FIG. 2-(1):

The forward search key 4 is actuated to place the dot display 9 under "A" of the A-Z indices 8, indicating that the presently selected letter is "A". At the same time, "A" is displayed at the first digit position of the display 7.

FIG. 2-(2):

The forward search key 4 is further actuated to place the dot display 9 under "B" of the A-Z indices 8 and to display "B" as the first digit of the display 7.

FIG. 2-(3):

Under the circumstances, the letter inputting key 5 is actuated to input "B", so that the cursor 11 is positioned at the second digit of the display 7.

FIG. 2-(4):

The backward search key 3 is actuated to back up the dot display 9 in "A" of the A-Z indices 8 and to display "A" as the second digit of the display 7.

FIG. 2-(5):

The backward search key 3 is further actuated to shift the dot display 9 under "Z" of the A-Z indices 8 and to display "Z" in the second digit.

FIG. 2-(6):

The above operations are repeated until the dot display 9 is displayed under "O" of the A-Z indices 8 and "O" is displayed in the second digit of the display 7.

FIG. 2-(7):

The letter inputting key 5 is actuated to input "O", so that words starting with "BO" are retrieved from a memory to output a leading word of a group of words starting with "BO". "BOARD" is the leading word in this case.

FIG. 2-(8):

The forward search key 4 is actuated to retrieve and display a word, "BOAT", subsequent to "BOARD" in an alphabetical order.

FIG. 2-(9):

The translation key 6 is actuated to translate the word "BOAT" into Japanese and display the Japanese word or words.

Figure 3:
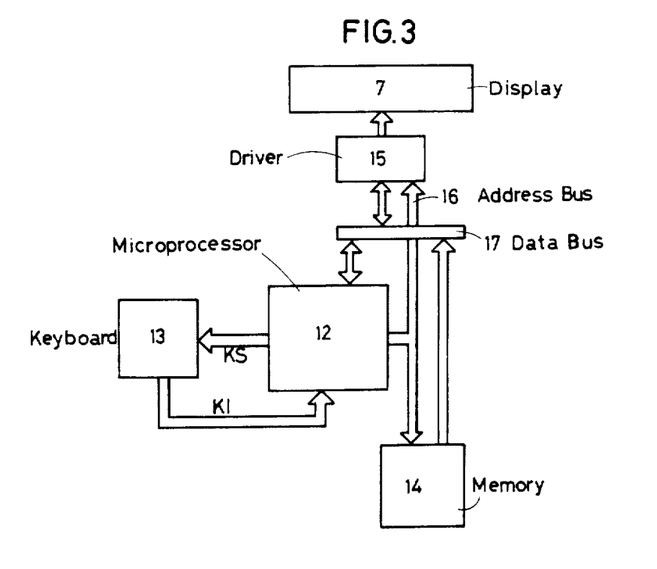
FIG. 3 shows a block diagram of a circuit implemented within the translator of FIG. 1.

FIG. 3 shows a circuit implemented within the translator of FIG. 1. The circuit comprises a microprocessor 12, a keyboard 13, a memory 14 for storing a great number of words, a driver 15, and the display 7.

The microprocessor 12 develops key strobe signals KS toward the keyboard 13 and receives key inputted signals KI therefrom to determine whether any key switch is operated. The microprocessor 12 selects an address of the memory 14 to read-in the contents of the memory 14. The driver 15 enables character patterns to be displayed in the display 7 in response to the introduction of display pattern information developed from the microprocessor 12. An address bus 16 and a data bus 17 are provided.

Figure 4:
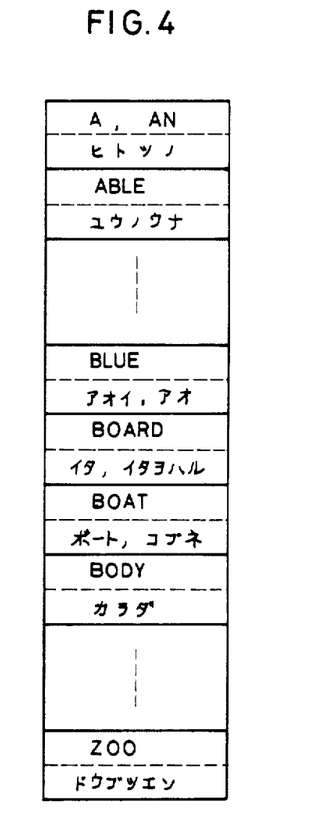
FIG. 4 shows exemplary contents of a memory connected in the circuit of FIG. 3.

FIG. 4 shows part of the contents of the memory 14. A great number of pairs of English words and their translated Japanese words are stored in the alphabetical order of the English words.

Figure 5:
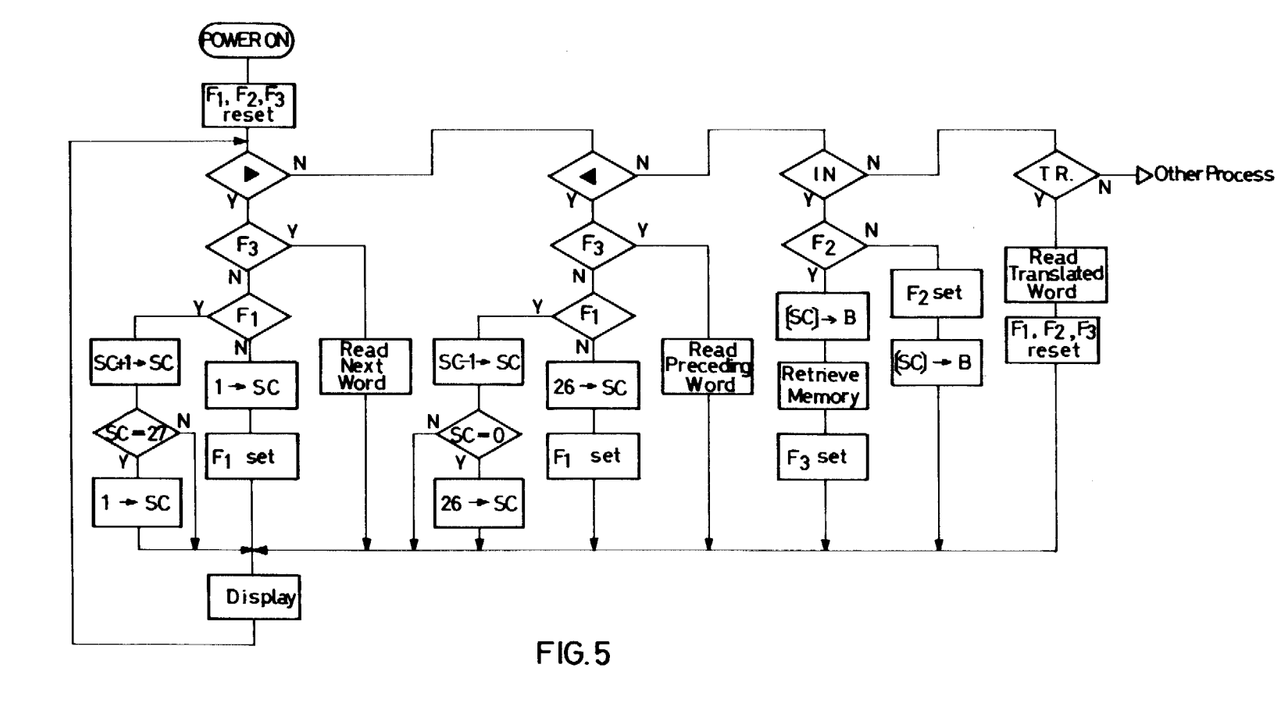
FIGS. 5 and 6 show flow charts of the operations of a microprocessor provided in the circuit of FIG. 3 to enable the operation shown in FIG. 2.

FIG. 5 shows a flow chart showing the operational steps of the microprocessor 12.

The microprocessor 12 comprises flags $F_1$, $F_2$ and $F_3$ and buffers SC and B.

The flag $F_1$ indicates that the forward search key 4 (▶) or the backward search key 3 (◀) has been operated. The flag $F_2$ indicates that the letter inputting key 5 has been once operated. The flag $F_3$ indicates that the second letter is inputted and the first letter has been already retrieved. The buffer SC stores a serial number of a letter.

The 26 letters are related to their serial numbers as follows:

| |
|---|
| A:1 |
| B:2 |
| C:3 |
| . |
| . |
| X:24 |
| Y:25 |
| Z:26 |

In the flowchart of FIG. 5, [SC] indicates a letter defined by the serial number stored in the buffer SC.

The operation of the microprocessor 12 is described with reference to the case where the word "BOAT" is translated to display its translated word.

Upon the power on, the flags $F_1$, $F_2$ and $F_3$ are reset. When the forward search key 4 is actuated, "1" is entered into the buffer SC and the flag $F_1$ is set. Upon the introduction of "1" into the buffer SC, the display of FIG. 2-(1) is enabled.

When the forward search key 4 is operated, the buffer SC is counted up because of the set condition of the flag $F_1$. Therefore, the display of FIG. 2-(2) is enabled.

When the letter inputting key 5 is operated, the flag $F_2$ is set to thereby enter letter "B", corresponding to the contents of the buffer SC, into the buffer B, as indicated in the display of FIG. 2-(B).

When the backward search key 3 is operated, the buffer SC is counted down so that the contents of the buffer SC become "1". The display of FIG. 2-(4) is enabled.

When the backward search key 3 is further operated, the buffer SC is counted down so that the contents of the buffer SC become "0". Therefore, "26" is inputted into the buffer SC. The display of FIG. 2-(5) is indicated.

Each time the backward search key 3 is operated, the buffer SC is counted down. When the contents of the buffer SC become "15", the display of FIG. 2-(6) is provided.

When the letter inputting key 5 is operated, alphabet "O" corresponding to the contents of the buffer SC is entered into the buffer B. A leading word of the group of words starting with input letters "BO" is retrieved to read out the word "BOARD". The flag $F_3$ is set. The display of FIG. 2-(7) is provided.

When the forward search key 7 is operated, the next word "BOAT" is outputted because of the set condition of the flag $F_3$. The display of FIG. 2-(8) is enabled.

Since the desired word "BOAT" is developed, the translation key 6 is operated to read out its translated word which is stored corresponding with the English word. After the flags $F_1$, $F_2$ and $F_3$ are reset, the display of FIG. 2-(9) is provided.

It may be possible that the backward search key 3 can be operated to retrieve any word preceding the presently retrieved word.

Thus, the forward/backward key is operated to retrieve any word belonging to a selected group of words.

The above retrieval operation may be enabled within the knowledge of the ordinary skilled person as shown in Kehoe et al, U.S. Pat. No. 4,159,536, issued June 26, 1979, entitled "Portable Electronic Language Translation Device". Kehoe et al patent is incorporated herein by reference.

Figure 6:
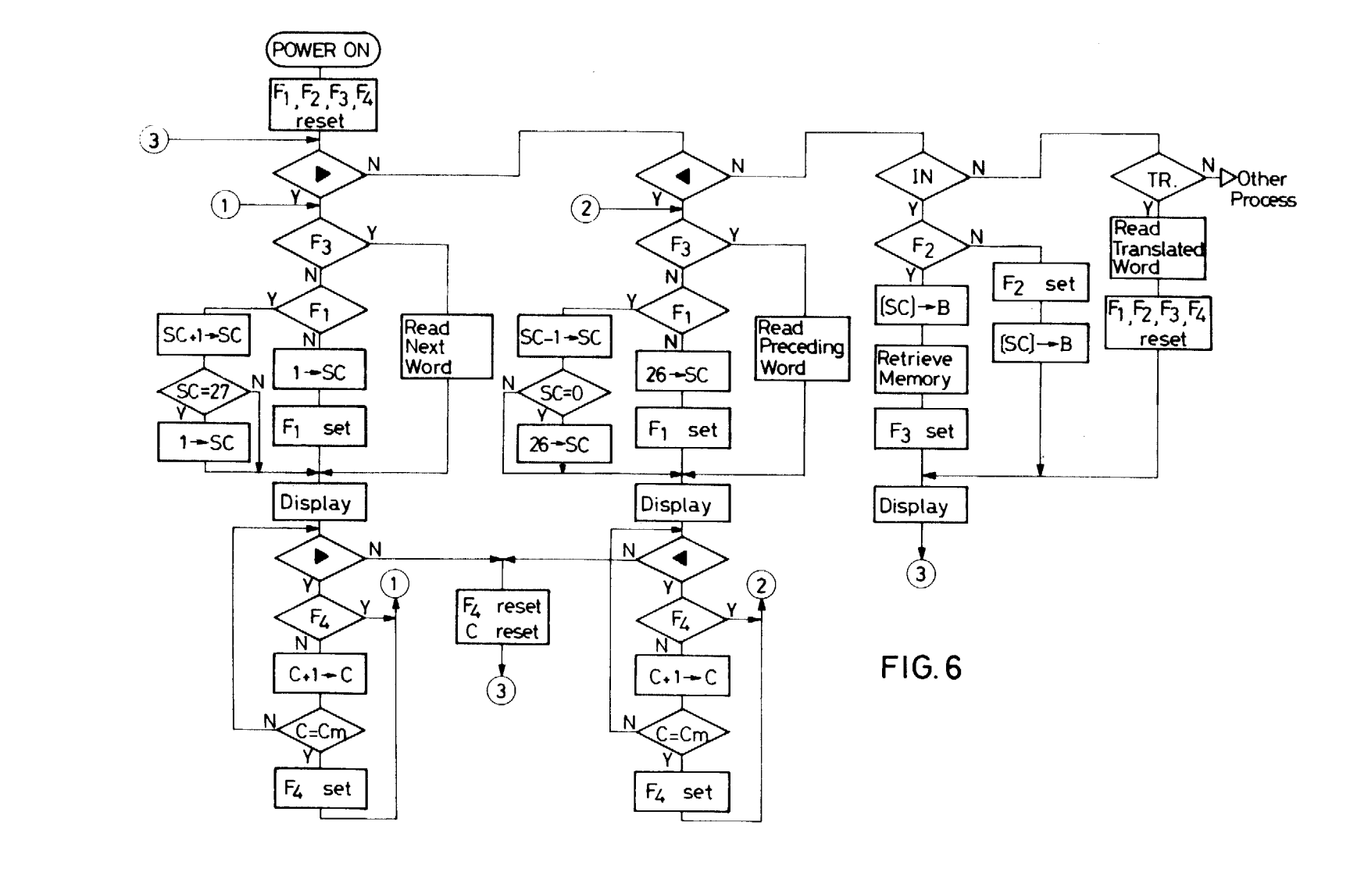

FIG. 6 shows a flow chart showing the operational steps of the microprocessor 12.

This flow chart is characterized as follows:

It is detected whether the actuation of the forward search key 4 or the backward search key 3 is continued for at least a predetermined time interval. The dot display 9 is continuously forwarded or backed up one letter at a time after each such predetermined interval so long as the search key 4 or 3 is operated.

For this purpose, the microprocessor 12 comprises a flag $F_4$ for indicating that the search key 4 or 3 is to be continuously operated for the predetermined time, and a counter C for counting the predetermined time. In the flow chart of FIG. 6, Cm indicates the predetermined time.

Attention is directed to another preferred embodiment of the present invention as shown in FIGS. 1, 3 and 7 to 9.

Figure 7:
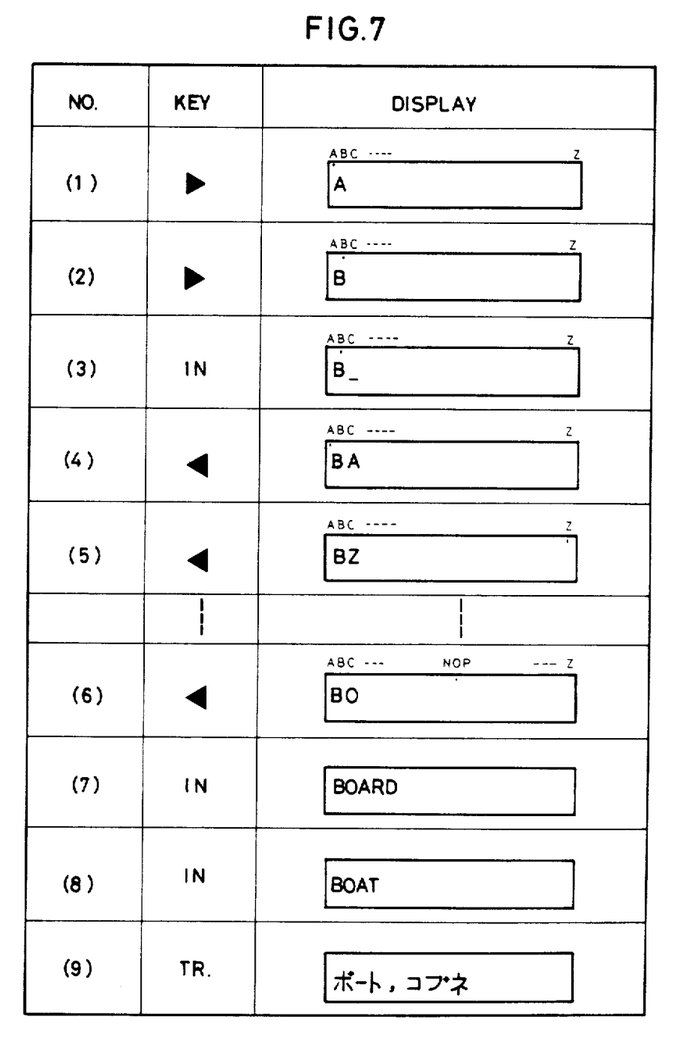
FIG. 7 shows a table representing the relation between key switches actuated and displays, in another specific form of the present invention.

FIG. 7 shows a table representing the relation between key switches actuated and displays. The table of FIG. 7 is identical with that of FIG. 2 except that, in the step of FIG. 7-(8), the letter inputting key 5 is actuated to retrieve and display the word "BOAT" after the leading word "BOARD".

Figure 8:
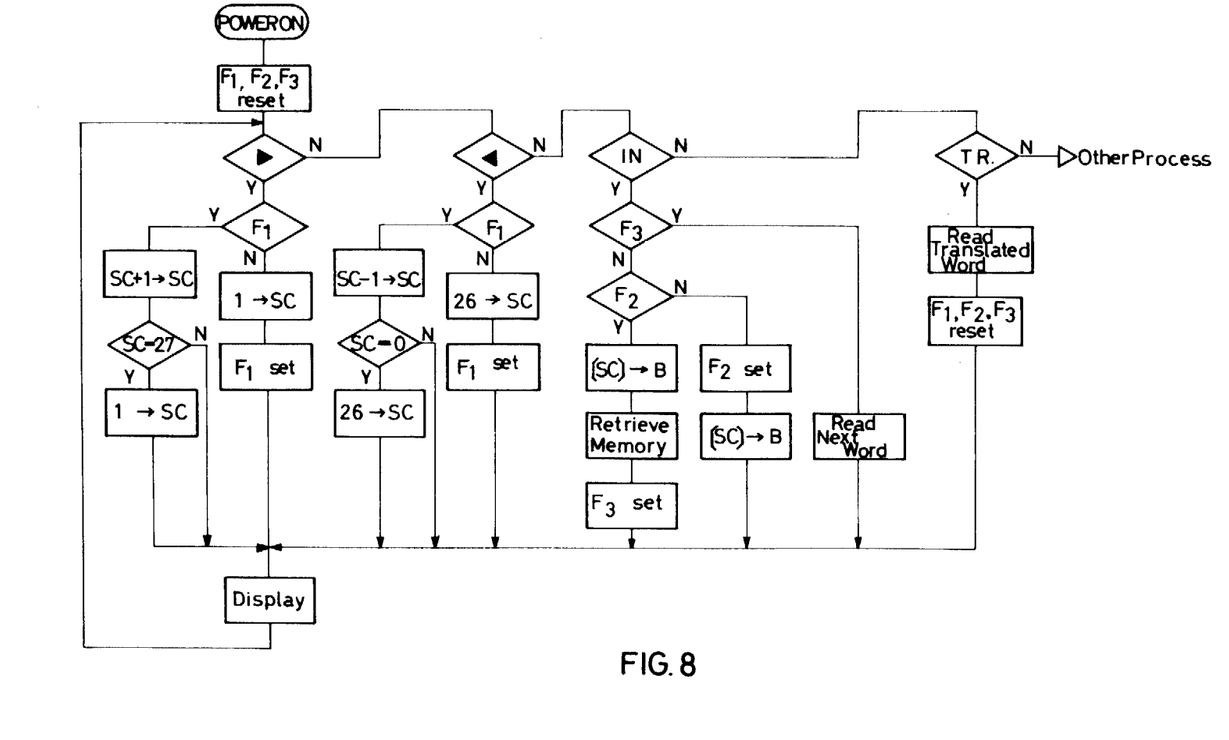
FIGS. 8 and 9 show flow charts of the operations of the microprocessor provided in the circuit of FIG. 3 to enable the operation shown in FIG. 7.

FIG. 8 shows a flow chart showing the operational steps of the microprocessor 12 to enable the operation shown in FIG. 7. Also in this example, the microprocessor 12 comprises those elements as required for enabling the steps of FIG. 5.

The operation of the microprocessor 12 as shown in FIG. 8 is characterized in that the letter inputting key 5 is operated to read out the word "BOAT" after the leading word "BOARD" because of the set condition of the flag $F_3$. Thus, display of FIG. 7-(8) is provided.

Figure 9:
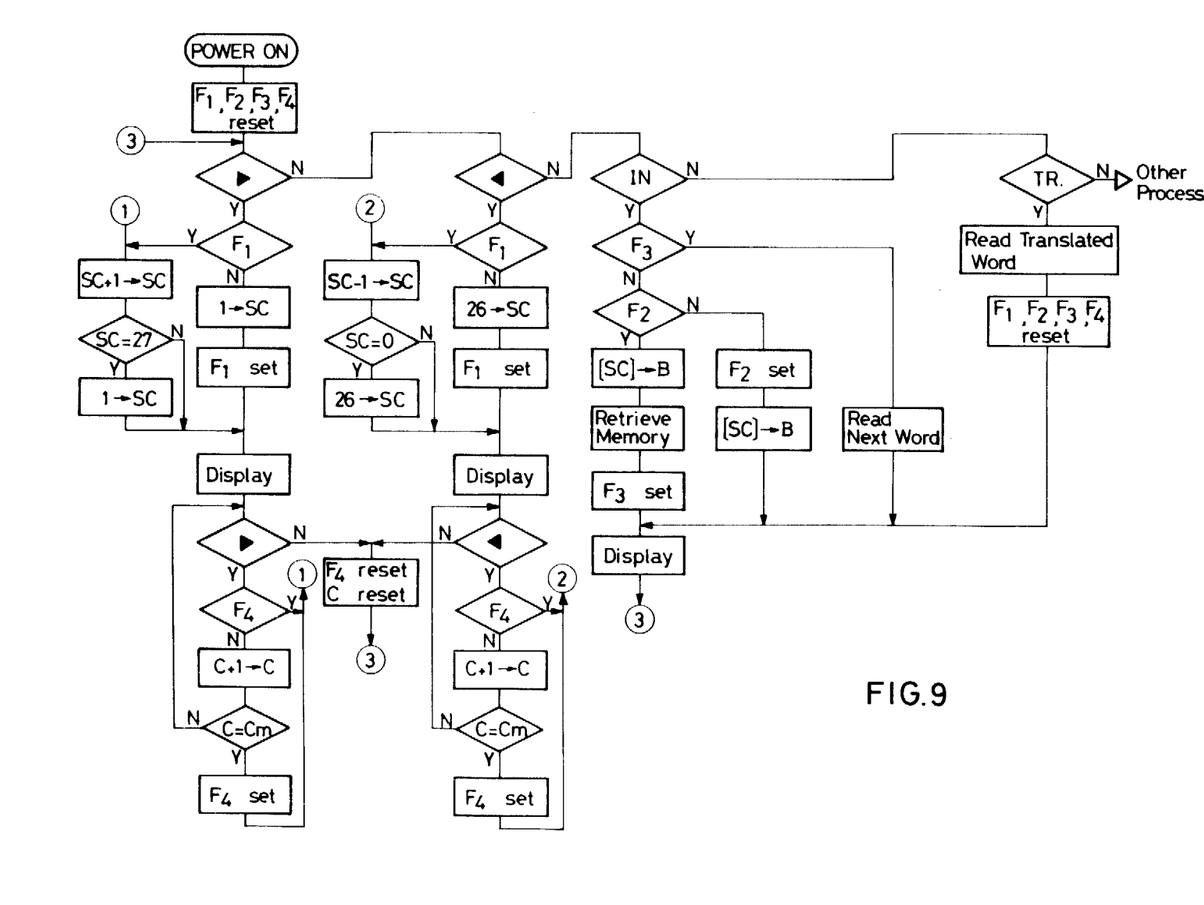

FIG. 9 shows a flow chart of the microprocessor 12 having the same purpose as that of the flow chart of FIG. 6. In FIG. 9, the letter inputting key 5 is also operated to read out the word "BOAT" after the leading word "BOARD".

It may be possible in FIG. 7 that the letter inputting key 5 can be operated to read out a word preceding another word.

Thus, the letter inputting key 5 is operated to retrieve any word belonging to a selected group of words.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator for translating first words in a first language into second words in a second language corresponding to said first words, comprising:
   memory means for storing a plurality of first words and a plurality of second words corresponding to said first words;
   input means for identifying a particular first word to be translated, said input means consisting essentially of:
   a plurality of indices representing letters of the alphabet of the first language;
   specifying means for selecting a sequence of letters, the number of letters in said sequence of letters being less than the number of letters in said particular first word, each letter of said sequence of letters being selected one at a time from among said indices; and
   letter input means including a single key on a keyboard operatively connected to said specifying means for inputting each letter of said sequence of letters after each letter is selected by said specifying means;
   access means connected to said input means and to said memory means and responsive to input means and to said memory means and responsive to input of said sequence of letters by said letter input means for retrieving from said memory means all said first words including said particular first word which include said sequence of letters, the selected number of said sequence of letters being less than the number of letters in said particular first word;
   word selector means connected to said access means for selecting and displaying on a display means all said first words in a predetermined order until said particular first word is displayed including said sequence of letters; and
   translate command means connected to said input means, said memory means, and said word selector means for initiating the translation of said particular first word selected by said word selector means to a second word retrieved from said memory means when said particular first word is displayed on said display means;
   said display means being connected to said access means for sequentially displaying all said first words accessed by said word selector means and the second words corresponding to said first words in response to actuation of the translation command means;
   whereby said particular first word may be selected and translated rapidly.

2. The translator of claim 1, wherein said plurality of indices comprises A-Z indices, and said specifying means comprises a dot display for specifying one of the A-Z indices and a forward/backward search key means for moving the dot display forward or backward.

3. The translator of claim 2, further comprising a microprocessor for controlling operation of said translator comprising:
   means for storing a first flag for indicating that the forward/backward search key means has been operated;
   means for storing a second flag for indicating that the letter input means has been once operated;
   means for storing a third flag for indicating that a second letter has been inputted following input of a first letter; and
   a buffer means for storing a serial number identifying a letter selected by said specifying means.

4. The translator of claim 3, wherein the microprocessor further comprises means for storing a fourth flag for indicating that the forward/backward search key means is continuously operated for a predetermined time, including a counter means for counting the predetermined time.

5. An electronic translator as in claim 2, wherein said word selector means is operated by operation of said forward/backward search key means.

6. An electronic translator as in claim 2, wherein said display means for displaying said first and second words also comprises said dot display of said specifying means.

7. The translator of claim 1, wherein said word selector means is operated to retrieve a word following said particular first word in alphabetical sequence.

8. An electronic translator as in claim 1, wherein said access means is responsive to input of said sequence of letters to retrieve a particular first word commencing with said sequence of letters.

9. An electronic translator as in claim 8, wherein said particular first word retrieved by said access means is the initial word in an alphabetized group of first words commencing with said sequence of letters.

10. An electronic translator as in claim 1, wherein said sequence of letters consists of two letters.

11. An electronic translator as in claim 8, wherein said sequence of letters consists of two letters.

12. An electronic translator as in claim 2, wherein said forward/backward search key means comprises said word selector means.

13. An electronic translator as in claim 4, wherein said forward/backward search key means changes the letter selected by said specifying means after each said predetermined time during which said forward/backward search key means is continuously operated.

14. An electronic translator as in claim 1, comprising a sole key for operating said letter input means and said word selector means.

15. An electronic translator as in claim 1, wherein said word selector means is operated to retrieve a word preceding said particular first word in alphabetical sequence.

* * * * *